INVENTORS P. G. EDWARDS
A. V. WURMSER

FIG. 4

Patented Sept. 8, 1953

2,651,678

UNITED STATES PATENT OFFICE 2,651,678

CODING AND SIGNALING SYSTEM

Paul G. Edwards, Verona, and Alphons V. Wurmser, Mount Bethel, N. J., assignors to Bell Telephone Laboratories, Incorporated, New York, N. Y., a corporation of New York Application December 19, 1950, Serial No. 201,632

9 Claims. (Cl. 179—15)

1

The present invention relates to interpolated speech transmission in which speech is transmitted in short fragments over available toll circuits with fragments from different talkers intermingled on the same circuits to make maximum use of the circuits by minimizing periods of no transmission during pauses between words or syllables of any one talker.

Systems of this general type heretofore proposed have provided for assignment of a given toll circuit to each talker in a given sequence or in preferential order or have employed at opposite ends of the trunk circuits subscriber identifying devices operating in sequential order or dependent upon synchronous control or accurately timed relationship. In accordance with the present invention, all talkers up to the capacity that has been determined for the system have equal access to all toll circuits not in use, and any toll circuit becomes immediately available for instantaneous use by any other subscriber as soon as it is released by the previous talker. The connections of subscriber lines to the toll circuits are made for short periods comparable to syllable length or vocal interval duration. By way of example a vocal interval may vary from about a fifth of a second to about a twentieth of a second, these being approximate and depending somewhat upon the individual talker. Efficiency of use of the toll lines is increased by making the periods of connection short since a toll circuit is not held by a talker during pauses between syllables or word portions.

A feature of the invention is a provision for switching at the two ends of the toll circuits such that certain equipment can be used in common by all subscriber lines and cross-talk is avoided while still giving all subscriber lines access to the toll circuits on an equal basis.

In accordance with this latter feature control tones are sent over the system, one tone persisting for the duration of the speech fragment being transmitted and another tone marking the beginning only of such fragment. These tones are used to control coordinate switching equipment at the two ends of the toll circuits.

A general object of the invention is to increase the effectiveness of voice spurt transmission over toll circuits of less number than the subscribers' lines simultaneously served, by improving the availability of the toll circuits to the subscriber lines.

Other objects and features of the invention will appear from the following detailed description of a system embodying the invention, in connection with the accompanying drawing in which:

Reference will be made first to the transmitter circuit shown on Figs. 1 to 4, inclusive.

Figures 1, 8:
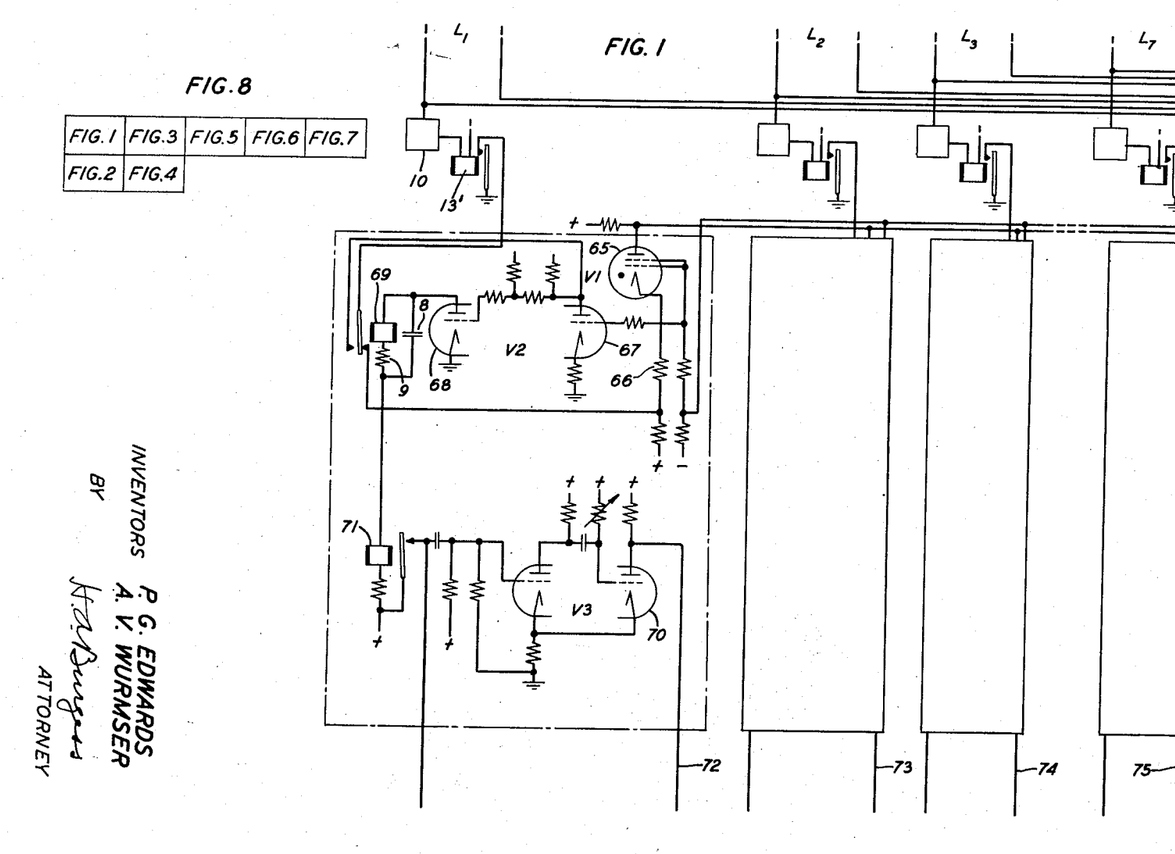
Figs. 1 to 7 when placed together as shown in Fig. 8 show in schematic circuit diagram a system of transmission in accordance with this invention.
Figure 2:
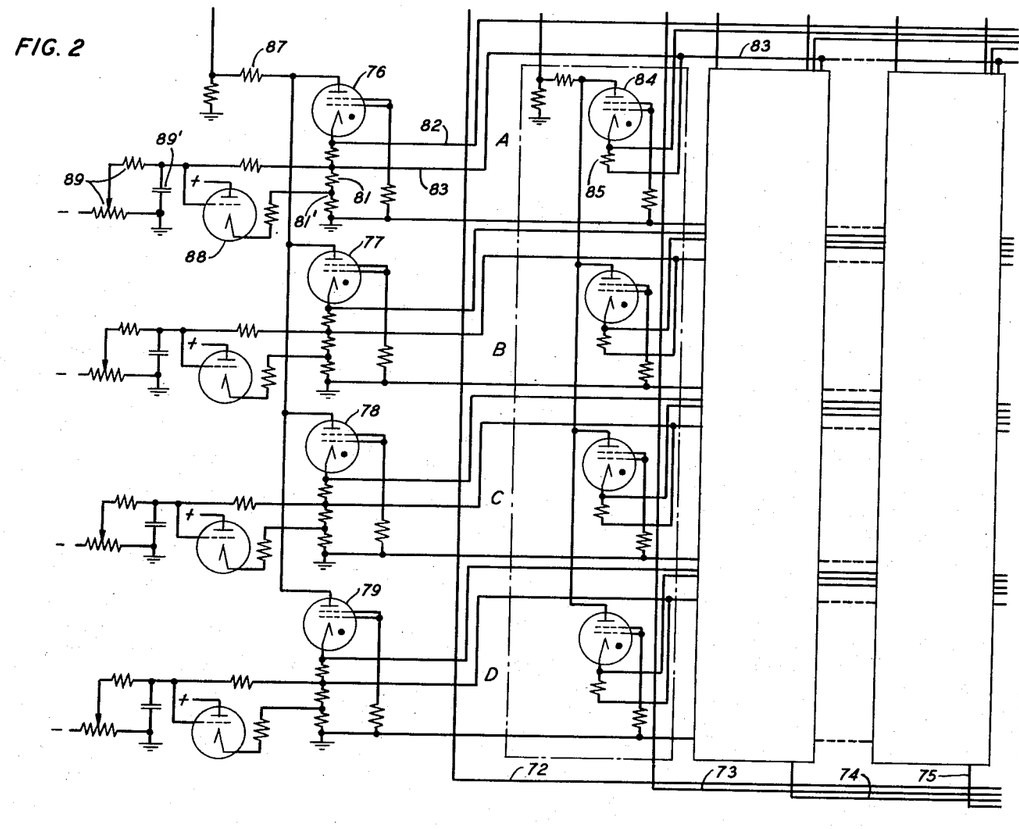

The seven subscriber lines are indicated at the top of Fig. 1 and each is shown provided with a voice-operated device 10 for controlling a relay 13' which is part of the vodas (or echo suppressor) circuit and may be the vodas relay itself or a relay operated with the vodas relay. This relay responds to voice spurts and remains operated throughout a voice spurt which may be assumed to be of syllable duration of the order of one-tenth to one-twentieth of a second for illustration.

Below the relays 13' is an access circuit comprising a bank of gas-filled tubes 65, one per subscriber line. Whenever a relay 13' operates it causes the corresponding tube 65 to fire. This firing of any tube 65 prevents any other tube 65 from firing for a brief interval such as a hundredth of a second. A subscriber-identifying tone is sent out under control of a tube 70, one per subscriber line, and at the same time selection is made of an idle one of the four circuits A, B, C, D (Fig. 2), by firing, in the case of subscriber line L*l*, one of the four gas-filled tubes 76, 77, 78 or 79. Each of these last tubes is one of a row of seven, there being therefore four rows. The firing of any tube in a row renders inoperable the other gas-filled tubes of the same row and so prevents seizure of a given channel by more than one subscriber at the same time.

The details of the foregoing operation follow. When a relay 13' pulls up, it applies ground at a point in the cathode circuit of tube 65 lowering the potential of the cathode sufficiently to permit the tube to fire, there being plate voltage on the plate of the tube at all times except when another gas tube in the row is conducting. Breakdown of tube 65 results in making its grids positive causing triode 67 to saturate and cutting off triode 68 which normally holds relays 69 and 71 energized. Relay 71 releases immediately but relay 69 is held operated for a hundredth of a second after relay 71 releases by condenser 8 and resistance 9, for a purpose to be described.

Figure 4:
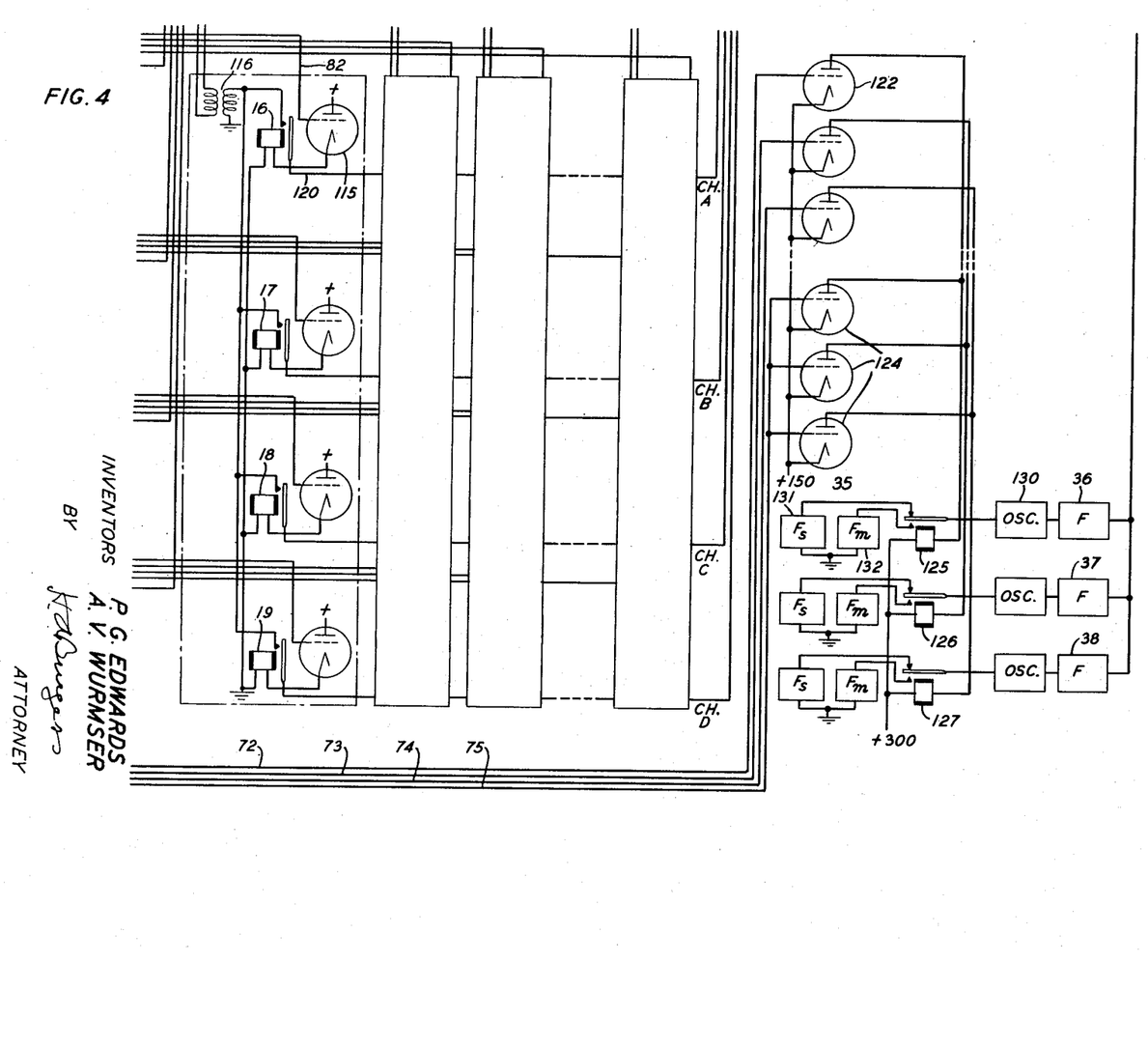

Relay 71 in releasing as described initiates operation of single-trip multivibrator 70 which executes one cycle resulting in application of a pulse, about a hundredth of a second long, to lead 72 extending to the tone coder 35 (Fig. 4)

for subscriber identification. As will be described, the tone coder performs its function of sending subscriber-identifying tones in this hundredth second interval after which it becomes available for use by other initiating subscribers. The purpose of holding relay 69 operated for a hundredth second after relay 71 releases is to allow the single trip multivibrator 70 and the tone coder which it controls to complete their cycle of operation before gas tube 65 becomes deenergized as a result of release of relay 69. As long as gas tube 65 remains energized other on-coming or waiting subscribers are denied control of the access circuit until the tone coder becomes available.

When relay 69 releases, it removes ground from the cathode of gas tube 65 and restores that tube, making the other tubes 65 of the access circuit usable by other subscriber lines. Relay 69 when released also maintains triode 68 cut off under control of ground from operated relay 13'. At the end of the voice spurt, relay 13' releases restoring the circuit to normal.

When a gas-filled tube such as tube 76 fires, on release of relay 71 as described, current is drawn through cathode resistor 81 raising the potential of conductors 82 and 83. Lead 83 forms part of the cathode-to-ground connection of each of the other tubes 84 etc., of the A row, and each tube has its own cathode resistor 85. The firing of any gas tube in the row A, including tubes 76, 84, etc., raises the potential of the cathodes of all the other tubes in the row sufficiently to prevent them from firing in response to a voice spurt on any subscriber line. Lead 82 applies positive voltage to the grid of tube 115 at the cross-point between the talking conductors of line L1 and channel A of the switching matrix of Fig. 4. This results in actuation of relay 16 which extends the voice path coming from the transmitting branch of line L1 through speech transformer 116 to the channel A conductor 120.

The interlock between the gas-filled tubes 65 of the access circuit prevents simultaneously occurring speech spurts on two subscriber lines from initiating channel selecting and switching operations at the same instant. Depending upon which tube 65 fires first, the corresponding tone sender tube 70 and channel seizing tube 76, 77 etc., operate to effect switching for one of the lines and as stated, a short interval of about a hundredth of a second must elapse before the speech spurt assumed to be present on the second line can initiate the switching operation for that line.

If all four channel selecting circuits A, B, C and D (Fig. 2), are idle when a speech spurt begins on any line, the channel that is selected depends upon which one of the four tubes 76, 77, 78 or 79 (in the column belonging to the line) fires first. One and one only of the tubes will fire and in firing will drop the plate voltage of the others below the ignition level by current flow through the common plate resistor 87. Each row of tubes 76, etc., has a busy signal tube 88 associated with its cathode resistor to maintain the row (such as A) busy for about a hundredth of a second after the reenergization of relay 71 at the end of a speech spurt. The time constant of the circuit is determined by resistance 89 and condenser 89'. The charge on 89' keeps the grid positive until the charge leaks below a critical value, and so maintains point 81' positive. Another speech spurt beginning during this brief holdover period is caused to select another row, assuming there is one idle. If only one talker is active this short holdover causes his line to rotate around the four channels thus giving some privacy.

Referring to the subscriber tone coder 35 (Fig. 4) this comprises twelve tubes, parts only of which are shown at 122, 124, etc. The upper three tubes have their grids connected to the first three leads 72, 73, 74. The next three leads (not shown) each connect to the grids of a pair of tubes (not shown) while the seventh and last lead 75 connects to three tubes 124. Each relay 125, 126, 127 is connected to four anodes, the anode of one of the upper three tubes, the anode of one of the lowest three tubes and the anode of one of each of two different pairs. This results in operating the relays 125, 126 and 127 either singly or in various combinations to provide the seven different identifications necessary for the seven subscriber lines.

When relay 125 operates it substitutes tuning elements 132 for tuning elements 131 of oscillator 130 to change its output from spacing to marking frequency. The other two oscillators are similarly controlled. These identifying signals are, as stated, in the form of short pulses occurring at the beginning of each speech spurt that is to be transmitted. Due to the interlock above described in the switch initiating circuits no two identifying tone combinations can be sent at the same time or in overlapping times but must be separated in time by about a hundredth of a second.

Five channels, the four speech channels A, B, C and D and the signal channel, are shown extending to the receiving station. In practice these may be separate wire lines. Alternatively, they can as well be any other suitable type of transmission channels, such as a radio or carrier channel in which case the conductors shown would lead to modulators supplied with different carrier frequencies at the transmitter, while suitable detectors would be used at the receiver, or time separation instead of or in addition to frequency separation may be used. The signal channel need not be a separate line or channel but the seven different frequencies from the oscillators 20 to 23 and 36, 37, 38 could be placed below or above a speech band or partly below and partly above the speech band as well as sent in part over different ones of the four speech channels.

Figure 3:
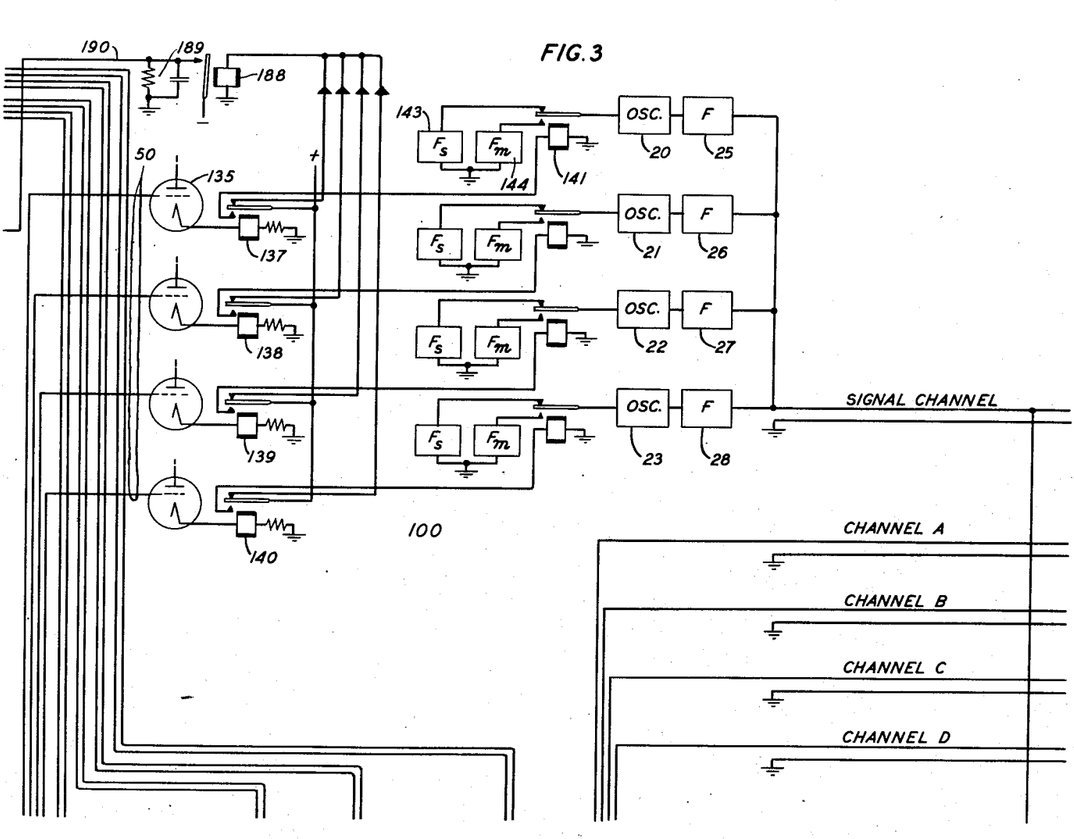

Reference will now be made to the channel identifier 100 (Fig. 3). The four control conductors 50 lead to the grids of tubes 135 etc., from the cathode resistor 81 of respective A, B, C, and D rows, one conductor being 83 leading to the grid of tube 135. Whenever any tube 76, 84, etc. in row A fires and places positive voltage on lead 83, tube 135 causes relay 137 to operate. Relays 138, 139 and 140 are similarly operated from tubes 77, 78, 79 respectively or from other tubes in the respective rows. It is the function of relays 137 to 140, inclusive, to send a channel-identifying tone to the distant end. The tones are controlled by relays 141 etc., which operate from front contacts of relays 137 etc., to shift the tuning of oscillators 20 etc., from normal or spacing frequency $F_s$ to marking frequency $F_m$ by exchanging timing controls 143 and 144 (Fig. 3).

A lockout relay 188 is energized from the back contacts of relays 137 to 140 in parallel. When all of these relays are operated no energizing path exists for relay 188 and it releases and applies negative voltage to conductor 190 extending to the grid circuits of all of the seven gas tubes 65 etc., thus preventing any of these tubes from firing in response to a speech fragment incoming from any line L1 to L7 inclusive, that may be seeking a channel. As soon as one of the four talkers using the four channels releases a channel the corresponding relay 137 to 140, inclusive, releases and energizes lookout relay 188 to interrupt the lockout condition at its back contact. Circuit 189 allows about a hundredth of a second hangover in this interruption.

Figure 5:
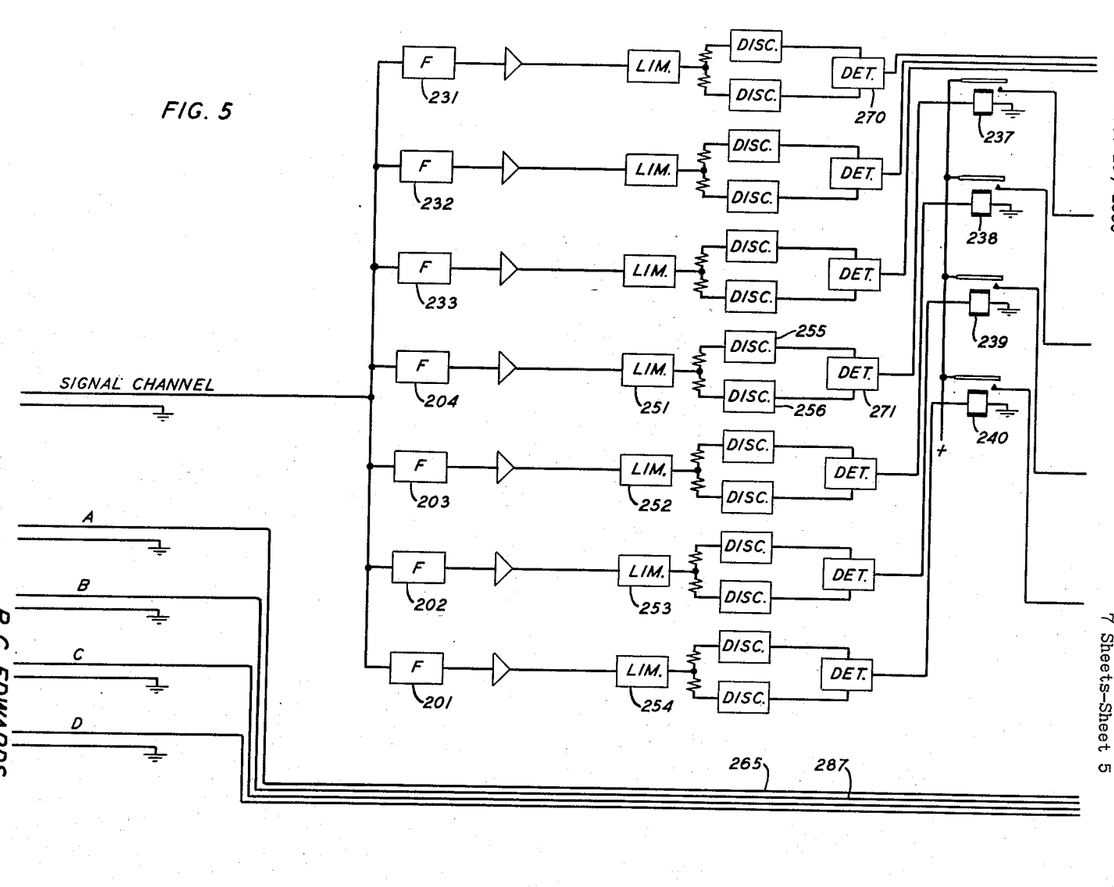

Reference will now be made to the receiving terminal shown on Figs. 5, 6 and 7. The channel selecting tones from the four filters 201—204 are lead through limiters 251 to 254 to discriminator circuits and detectors. Each limiter such as 251 is followed by a pair of discriminator branches 255, 256 to differential detector 271 which converts the marking and spacing frequencies on its channel into current and non-current signals for operating the corresponding relay 237.

The subscriber-selecting tones are received through filters 231 to 233, inclusive and are passed through limiter and detector circuits 270 etc., for controlling the three relays 225 to 227, inclusive. These respond singly or in various combinations to actuate selectively the seven relays 214 to 220, inclusive, of the subscriber-selector circuit, Fig. 6. Relays 214 to 220 are all normally energized and selection of a subscriber is made by releasing the corresponding relay, thus connecting ground at its back contact to the outer grids of the thyratrons in the corresponding vertical column instead of the normal negative bias. Relay 214 is normally energized from the back contact of relay 225 and will be released when relay 225 is energized provided neither relay 226 nor 227 is also energized. Relay 215 is released by energization of relay 226 only, etc. Release of relay 216, 217 or 218 requires energization of a pair of relays 225—227, while all three relays must energize in order to release relay 220. In this manner the seven selections are made by use of three relays 225—227 controlled by three tones.

When any speech spurt is received at the receiving station the subscriber tone pulse received with its selects one of the seven relays 214 to 220 (Fig. 6) and releases it. Also, the channel tone received with the speech spurt operates one of the channel selecting relays 237 to 240 (Fig. 5). When one of the latter relays operates, it applies plate voltage to seven thyratrons in the corresponding row, such as 301, 302, etc., of the channel A row. This alone will not cause any thyratron to fire, however, since the shield grids of all thyratrons are normally held too far negative to fire by battery applied over vertical conductors 310, 311, etc. This negative voltage is removed from any vertical column of thyratrons by selection (release) of a subscriber tone relay 214, 215, etc. When this disabling voltage is removed and plate voltage is applied, only that thyratron at the cross-point of the marked channel and subscriber buses will respond, this being the selected thyratron. The initiation of the plate voltage produces a momentary positive pulse which nullifies the negative voltage applied to the inner grid over the conductor 315 (considering channel A) from bias source 317, this pulse coming from flow of surge current through condenser 318 and through varistor 319 in its forward direction. This causes the selected thyratron to fire and drop the plate voltage on those of the same channel by current through common resistor such as 321.

Figure 7:
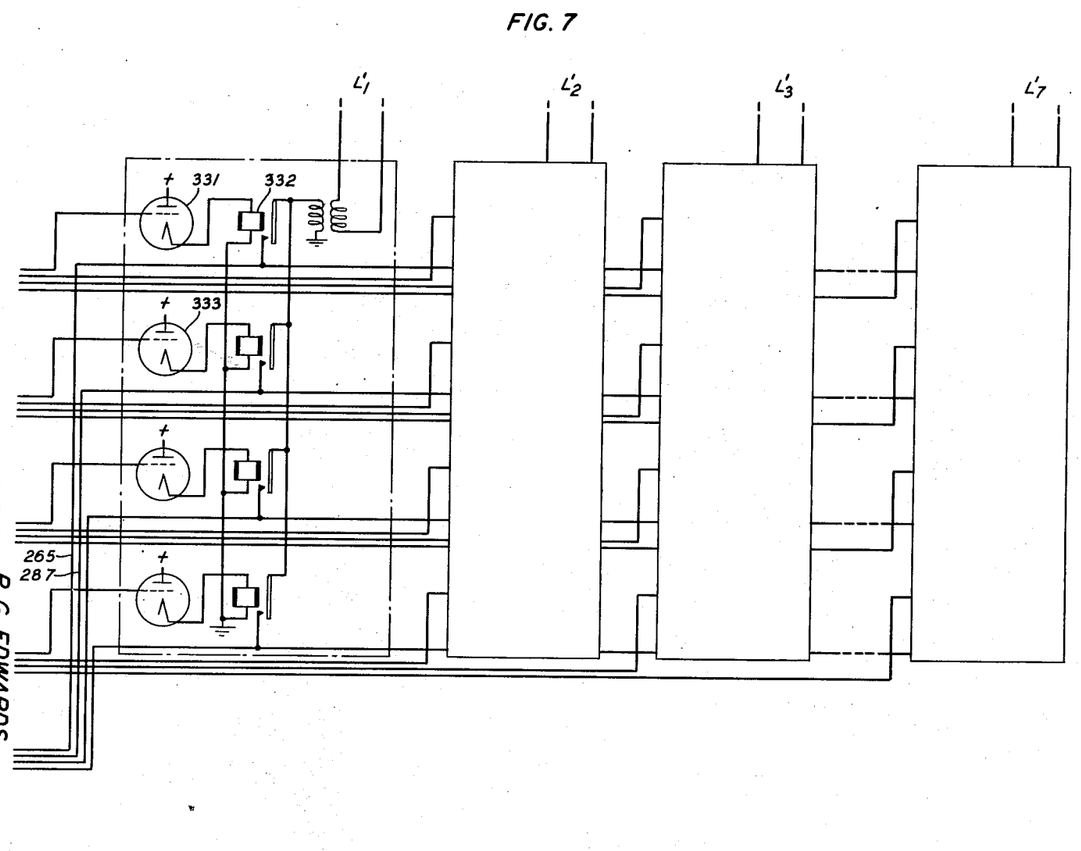

Each of the seven gas tubes in a channel row has an individual lead extending from its cathode to the control grid of a triode 331 etc. in the corresponding row of the subscriber connector (Fig. 7). The firing of one of the thyratrons puts a positive pulse on the grid of the respective triode causing relay such as 332 to energize and connect the speech lead of that channel to the corresponding subscriber line L'1 to L'7.

Any thyratron 301 etc. in the subscriber selector when once fired remains ionized until its plate voltage is removed, notwithstanding that relays 214 to 220 release, when selected, for only about one-hundredth second and, again energizing, reapply negative voltage to the shield grids of the tubes in the respective column. As long as the channel tone persists, holding one of relays 237—240 (Fig. 5) operated, the one operated thyratron in the corresponding row in the subscriber selector holds the subscriber connecting tube and relay (such as 331 and 332) actuated to maintain the connection. Upon release of an operated relay in the group 237—240, Fig. 5, the circuit is restored.

Figure 6:
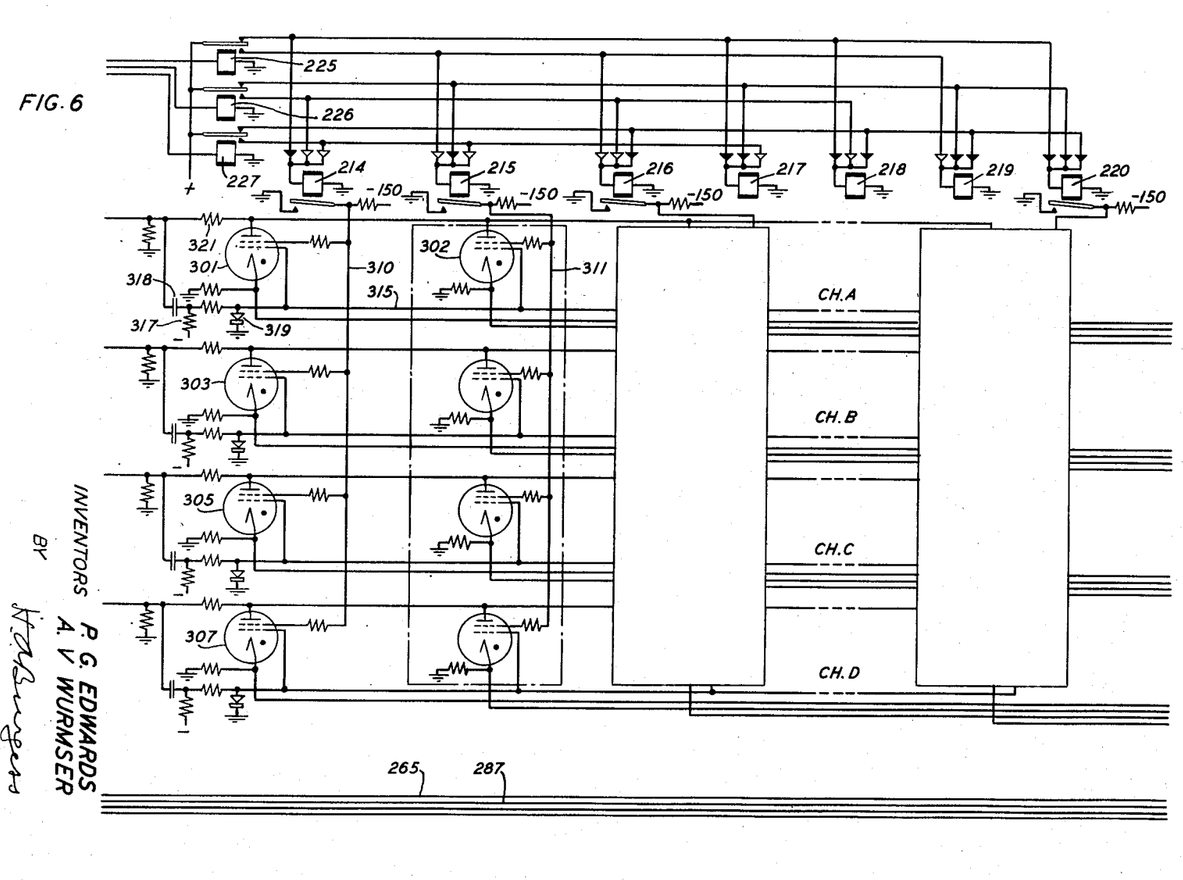

Since each subscriber selecting relay 214—220, Fig. 6, releases as soon as a connection to the desired subscriber is made, these relays become available for use by other subscribers in making calls.

The cordinate switching circuits used at the receiver as specifically disclosed herein are claimed in an application of D. Robertson and A. V. Wurmser Serial No. 201,631 filed December 19, 1950; and the coordinate switching circuits used at the transmitting terminal as specifically disclosed herein are claimed in an application of D. Robertson Serial No. 201,563 filed December 19, 1950.

It is to be understood that various modifications may be made in the circuits within the scope of the invention.

What is claimed is:

1. In a telephone system, a group of subscriber lines, a smaller number of trunk circuits, a switching circuit for connecting any subscriber line of the group to any one of said trunk circuits one at a time, a voice-operated access circuit for giving each line access to said switching circuit, comprising a device per line operating in response to a vocal-interval speech spurt on the respective line, said device in responding to a speech spurt disabling all of the other devices, means operated by the response of a device for seizing an idle trunk circuit and connecting the respective subscriber line thereto, said last means in its operation rendering all of the other devices again operable.

2. A combination according to claim 1, including a circuit for sending a subscriber-identifying signal to the distant station, said device in responding to a speech spurt causing said circuit to transmit the signal characteristic of the respective subscriber line and means to limit the duration of said signal to a small fraction of a speech spurt length.

3. In a telephone system, for transmitting spurts of speech from subscribers' lines over a group of toll circuits in common, a connecting point per subscriber line per toll circuit at the transmitting terminal for effecting connection between any line and any toll circuit for the duration of a speech spurt to be sent, an access circuit common to said subscriber lines and operating in response to a speech spurt on one of said lines for effecting connection of such line to an available toll circuit, means rendering said access circuit usable by only one subscriber line at a time for effecting a connection and means releasing said access circuit for use by other subscriber lines a predetermined time after connection to a toll circuit has been effected.

4. A combination according to claim 3, in which said access circuit has equal access at all times to all idle toll circuits.

5. A speech spurt switching system for connecting subscriber lines to a lesser number of trunk paths for simultaneous speech transmission to a distant station by said lines comprising a connection point per subscriber line per trunk path, voice-operated switching means for effecting a connection at any available one of said connection points, means operated by said voice-operated means for sending to the distant station a subscriber-identifying signal of a duration that is only a small fraction of the length of the speech spurt being transmitted, and means operated by said voice-operated means for sending to the distant station a path-identifying signal for the duration of the transmitted speech spurt.

6. In a telephone system a group of subscriber lines, a lesser group of trunk circuits, connecting means capable of connecting said lines to said trunk circuits for short intervals of the order of syllable duration comprising a voice-operated device per subscriber line, a connection point per subscriber line per trunk circuit, means operated from each device in response to a speech spurt on the corresponding subscriber line for momentarily preventing the devices of all other subscriber lines from operating, switch means operated from an operated device for controlling actuation of one of said connection points to effect connection between the corresponding subscriber line and an available trunk circuit, said switch means in operating releasing to operable condition the devices of the other subscriber lines, and means controlled from said switch means in its operation for preventing actuation of more than said one connection point in response to operation of said device in response to said speech spurt.

7. The combination claimed in claim 6, including means operated from said switch means in its operation for rendering inoperable by other subscriber lines the connection points between said other lines and the trunk circuit between which and said corresponding subscriber line said connection is effected.

8. In a speech-spurt system, groups of subscriber lines, trunk circuits for effecting interconnection between said groups on a speech-spurt basis, means at a sending end of the system operating in response to initiation of a speech spurt on a line for seizing an outgoing idle trunk circuit and transmitting to the distant end a tone identifying the seized trunk circuit and a signal identifying the subscriber line to which the seized trunk circuit is to be connected, means causing said tone to persist for the duration of the speech spurt being transmitted, means limiting the duration of said signal to a small fraction of a speech-spurt length, means giving said seized trunk circuit at said distant end access to all of the subscriber lines in the group of lines thereat, means controlled in response to said signal for conditioning the subscriber line identified thereby for connection to any one of said trunk circuits to receive a speech spurt therefrom, and means controlled by said tone for effecting connection of the seized trunk circuit to only the subscriber line so conditioned.

9. The combination according to claim 8 including means operating in response to the effecting of said connection for disabling the means giving the seized trunks circuit access to all of said subscriber lines of the group at said distant station excepting only that subscriber line to which said connection has been effected.

PAUL G. EDWARDS.
ALPHONS V. WURMSER.

References Cited in the file of this patent

UNITED STATES PATENTS

| Number | Name | Date |
| --- | --- | --- |
| 2,271,000 | Lowell | Jan. 27, 1942 |
| 2,388,001 | Loughren | Oct. 30, 1945 |